United States Patent [19]

Feuser et al.

[11] Patent Number: 4,924,754
[45] Date of Patent: May 15, 1990

[54] CIRCUIT ARRANGEMENT FOR A HYDRAULIC DRIVE IN A POSITION CONTROL CIRCUIT

[75] Inventors: Alfred Feuser, Lohr-Rodenbach; Joachim Neumann; Walter Voxbrunner, both of Lohr am Main, all of Fed. Rep. of Germany

[73] Assignee: Mannesmann Rexroth GmbH, Lahr Postfach, Fed. Rep. of Germany

[21] Appl. No.: 320,103

[22] Filed: Mar. 6, 1989

[30] Foreign Application Priority Data

Mar. 11, 1988 [DE] Fed. Rep. of Germany ....... 3808177

[51] Int. Cl.$^5$ ............................................. F13B 9/03
[52] U.S. Cl. .................................................. 91/363 R
[58] Field of Search ................................. 91/363 R, 35

[56] References Cited

U.S. PATENT DOCUMENTS 2,984,214 5/1961 Wysocki ........................... 91/363 R
4,218,956 8/1980 Uno et al. .......................... 91/363 R

FOREIGN PATENT DOCUMENTS 2011713 9/1971 Fed. Rep. of Germany .
2826365 4/1979 Fed. Rep. of Germany .
2919722 3/1980 Fed. Rep. of Germany .
3532931 4/1987 Fed. Rep. of Germany .
61-31702 2/1986 Japan .

*Primary Examiner*—A. Michael Chambers
*Attorney, Agent, or Firm*—Ernest A. Beutler

[57] ABSTRACT

For path control of a plurality of drives, i.e. for driving a plurality of drives in different axes in geometrical path dependence, to obtain high accuracy it is necessary for the lag error of the drives to remain constant. According to the invention for this purpose a circuit arrangement is proposed in a cascade structure in which from the speed of each individual path drive and the control deviation determined from the actual value and desired value of the position a difference signal is formed which is integrated and added to the output signal of a P controller.

16 Claims, 1 Drawing Sheet

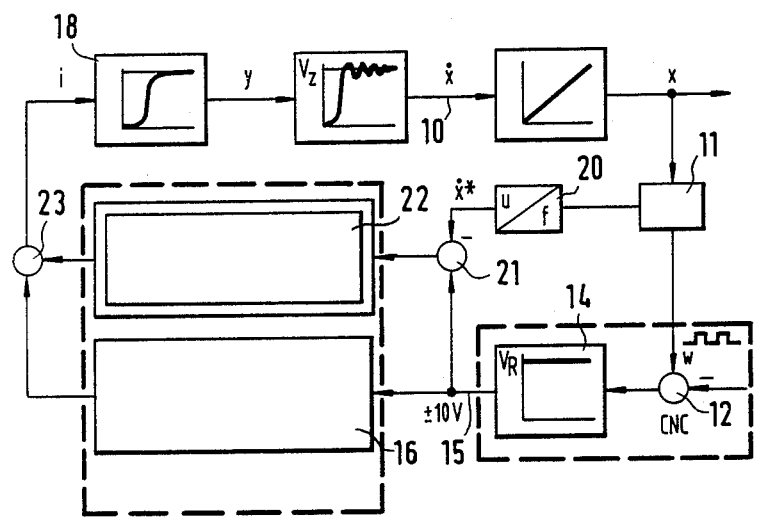

CIRCUIT ARRANGEMENT FOR A HYDRAULIC DRIVE IN A POSITION CONTROL CIRCUIT

BACKGROUND OF THE INVENTION

The invention relates to a circuit arrangement for a hydraulic drive as controlled system.

In numerous drives, in particular hydraulic cylinders, it is necessary for the component to be moved by the drive to be moved with high accuracy as regards speed and position. This applies to a particular extent in continuous-path controls in which a plurality of drives, provided for example for driving tools or workpieces in several axes, are to be driven in mutual geometrical dependence. An example of such a continuous-path control is the non-cutting deformation in the production of rims.

For controlling the fluid paths between the hydraulic drive and a fluid source or a tank in each case a servo or proportional valve is provided. Due to the non-linearity of the valve characteristic and counter forces and frictional forces acting on the drives a lag error difference of the drives with respect to each other occurs so that therefore a drive lags behind another drive in its movement.

To avoid such contour or lag error differences it is not sufficient to provide for the path control a closed-loop control in which the actual value of the position of the hydraulic drive is detected as controlled variable. For example in a system using a displacement pickup and a comparator for comparing the controlled variable with the desired value of the position a control deviation is formed which is converted in a control amplifier to a manipulated variable with which the valve is driven. Even when the control or servo amplifier is constructed as controller with observer for taking account of the peculiarities of the hydraulic controlled system such a lag error difference cannot be avoided.

The invention is thus based on the problem of further developing the circuit arrangement in such a manner that the lag error difference arising in such continuous-path controls is avoided. The constructional expenditure is to be small and the circuit arrangement is to be suitable for path control in driving drives with several axes.

SUMMARY OF THE INVENTION

The invention embodies a cascade circuit in which a signal corresponding to the speed of the drive and the control deviation supplied to the controller are compared with each other and the difference is formed which is supplied to an integrator of which the output is added to the output variable of the controller. The speed of the drive is preferably determined in a transducer or converter from the time variation of the position. As long as the difference between the control deviation and the speed signal is equal to zero the lag error remains constant. If differences occur between the two signals due to non-linearities in the valve characteristic and/or counter forces, etc., said differences are regulated out by the integrator so that the speed of the drive and thus the lag error remain constant. It is of particular advantage that the adjustment range of the integrator is relatively small because only the difference between the control deviation and the speed signal is supplied to said integrator.

BRIEF DESCRIPTION OF THE DRAWING

An example of embodiment of the invention will be explained in detail hereinafter with the aid of the single drawing in which a circuit arrangement is shown as block circuit diagram.

DETAILED DESCRIPTION OF THE PREFERRED EMBODIMENT OF THE INVENTION

The controlled system 10 consists of a hydraulic cylinder which drives a carriage of which the particular position reached is denoted by x. The controlled variable (actual value) is detected in a digital displacement pickup 11, for example a photooptical digital means, and compared in a comparator 12 with a reference variable (desired value) w. The output of the comparator 12 represents the control deviation which is amplified proportionally in an amplifier 14 and is available as voltage at the output 15. The control deviation is supplied to a controller 16 which can implement certain control algorithms in classical form, for example is a $PDT_1$ controller, or is constructed as state controller with observer to take account of the peculiarities of the hydraulic controlled system. The manipulated variable i at the output of the controller 16 is supplied to a servo or proportional valve 18 which executes a travel y and thus controls the fluid flow to the cylinder in such a manner that the latter is driven with a speed x. To this extent the control of a hydraulic drive is known.

Also provided are a transducer 20, a comparator 21, an integrator 22 and an adder 23. The transducer 20 is connected to the displacement pickup 11 and determines from the time variation of the position x the particular speed x driven. This speed signal is supplied to the comparator 21. In the comparator 21 the difference between the speed signal and the control deviation at the output 15 is formed. The difference is integrated in the digital integrator 22 and the outputs of the integrator 22 of the controller 16 are added in the comparator 23 and thus form the manipulated variable i for the valve 18.

In the circuit arrangement illustrated the controller 16 is preferably constructed as $PDT_1$ controller or state controller, i.e. does not have an integrating section.

As long as the difference between the control deviation 15 and the speed signal of the transducer 20 is zero the lag error remains constant. If however the comparator 21 detects a difference between the two signals due to the non-linearities of the valve characteristic, friction or counter forces, said differences are regulated out by the integrator so that the speed of the drive and the lag error remain constant. Although the integrator 22 processes only the difference signal of the comparator 21 and thus has a considerably reduced adjustment range, the modified cascade circuit according to the invention is an optimum arrangement.

We claim:

1. Circuit arrangement for controlling a hydraulic system having a valve for controlling fluid paths between a drive, a fluid source and a tank, and a controller for driving the valve according to an output in dependence upon a control deviation, said circuit arrangement comprising:

a first comparator for forming the control deviation from a desired value and an actual value of the position of the drive;

a second comparator for computing a difference between the control deviation and a signal representing the speed of the drive;

an integrator for integrating the difference formed in the second comparator; and means for adding the integrated result to the output of the controller.

2. Circuit arrangement according to claim 1, further comprising a transducer for determining the speed of the drive from the time variation of the actual value of the position of the drive.

3. Circuit arrangement according to claim 2 characterized in that the control deviation formed in the first comparator is proportionally amplified in an amplifier.

4. Circuit arrangement according to claim 3 characterized in that the integrator operates digitally.

5. Circuit arrangement according to claim 2 characterized in that the integrator operates digitally.

6. Circuit arrangement according to claim 2, characterized in that a transducer for determining the speed of the drive from the time variation of the controlled variable.

7. Circuit arrangement according to claim 6 characterized in that the integrator operated digitally.

8. Circuit arrangement according to claim 7 characterized in that the control deviation formed in the first comparator is proportionally amplified in an amplifier.

9. Circuit arrangement according to claim 8 characterized in that the integrator operates digitally.

10. Circuit arrangement according to claim 1 characterized in that the controller is a $PDT_1$ controller without an integrating section.

11. Circuit arrangement according to claim 3 characterized in that the control deviation formed in the first comparator is proportionally amplified in an amplifier.

12. Circuit arrangement according to claim 10 characterized in that the integrator operated digitally.

13. Circuit arrangement according to claim 3 characterized in that the integrator operates digitally.

14. Circuit arrangement according to claim 1 characterized in that the control deviation formed in the first comparator is proportionally amplified in an amplifier.

15. Circuit arrangement according to claim 1 characterized in that the integrator operates digitally.

16. Circuit arrangement according to claim 1 characterized in that the controller is a state controller with observer.

* * * * *

UNITED STATES PATENT AND TRADEMARK OFFICE
CERTIFICATE OF CORRECTION

PATENT NO. : 4,924,754
DATED : May 15, 1990
INVENTOR(S) : Feuser, et al

It is certified that error appears in the above-identified patent and that said Letters Patent is hereby corrected as shown below:

Column 3, line 24, Claim 7, "operated" should be --operates--.
Column 4, line 1, Claim 8, "7" should be --6--.
Column 4, line 9, Claim 11, "3" should be --10--.
Column 4, line 12, Claim 12, "10" should be --11--.
Column 4, line 13, Claim 12, "operated" should be --operates--.
Column 4, line 14, Claim 13, "3" should be --10--.

Signed and Sealed this

Twenty-fourth Day of November, 1992

Attest:

DOUGLAS B. COMER

Attesting Officer

Acting Commissioner of Patents and Trademarks